US005098553A

United States Patent [19]
Sapre

[11] Patent Number: 5,098,553
[45] Date of Patent: * Mar. 24, 1992

[54] CATALYTIC CRACKING PROCESS USING REGENERATOR WITH MULTIPLE CATALYST OUTLETS

[75] Inventor: Ajit V. Sapre, West Berlin, N.J.

[73] Assignee: Mobil Oil Corporation, Fairfax, Va.

[ * ] Notice: The portion of the term of this patent subsequent to Nov. 5, 2008 has been disclaimed.

[21] Appl. No.: 577,166

[22] Filed: Sep. 4, 1990

Related U.S. Application Data

[63] Continuation-in-part of Ser. No. 431,952, Nov. 6, 1989, Pat. No. 5,062,944.

[51] Int. Cl.⁵ .................... C10G 11/00; C10G 35/00; B01J 20/34
[52] U.S. Cl. .................... 208/113; 208/153; 208/164; 502/41
[58] Field of Search .................... 208/113, 153, 164; 502/41

[56] References Cited

U.S. PATENT DOCUMENTS

| | | | |
|---|---|---|---|
| 3,448,037 | 6/1969 | Bunn, Jr. | 208/164 |
| 3,817,280 | 6/1974 | Celani | 137/592 |
| 3,904,548 | 9/1975 | Fagan et al. | 252/417 |
| 3,926,778 | 12/1975 | Owen et al. | 208/74 |
| 4,072,600 | 2/1978 | Schwartz | 208/120 |
| 4,093,535 | 6/1978 | Schwartz | 208/120 |

*Primary Examiner*—Anthony McFarlane
*Assistant Examiner*—Nhat Phan
*Attorney, Agent, or Firm*—Alexander J. McKillop; Charles J. Speciale; Richard D. Stone

[57] ABSTRACT

An improved process for regeneration of catalyst used in fluidized catalytic cracking of hydrocarbons using a cross-flow or swirl type catalyst regenerator is disclosed. Instead of a single catalyst withdrawal outlet for regenerated catalyst, multiple catalyst withdrawal points are provided. Use of multiple catalyst outlets, or a continuous radial catalyst outlet, greatly reduces stagnant regions in the bed. The process is useful in FCC units having inventories of from 10 to 100 tons of catalyst.

13 Claims, 4 Drawing Sheets

CATALYTIC CRACKING PROCESS USING REGENERATOR WITH MULTIPLE CATALYST OUTLETS

CROSS REFERENCE TO RELATED APPLICATIONS

This application is a Continuation-In-Part of prior copending application Ser. No. 431,952, filed on Nov. 6, 1989, and now U.S. Pat. No. 5,062,944. This prior application is relied upon and incorporated herein by reference.

BACKGROUND OF THE INVENTION

1. FIELD OF THE INVENTION

The invention relates to the regeneration of fluidized catalytic cracking catalyst.

2. DESCRIPTION OF RELATED ART

Catalytic cracking of hydrocarbons is carried out in the absence of externally supplied H2, in contrast to hydrocracking, in which H2 is added during the cracking step. An inventory of particulate catalyst is continuously cycled between a cracking reactor and a catalyst regenerator. In the fluidized catalytic cracking (FCC) process, hydrocarbon feed contacts catalyst in a reactor at 425° C. -600° C., usually 460° C.-560° C. The hydrocarbons crack, and deposit carbonaceous hydrocarbons or coke on the catalyst. The cracked products are separated from the coked catalyst. The coked catalyst is stripped of volatiles, usually with steam, and is then regenerated. In the catalyst regenerator, the coke is burned from the catalyst with oxygen containing gas, usually air. Coke burns off, restoring catalyst activity and simultaneously heating the catalyst to, e.g., 500° C.-900° C., usually 600° C.-750° C. Flue gas formed by burning coke in the regenerator may be treated for removal of particulates and for conversion of carbon monoxide, after which the flue gas is normally discharged into the atmosphere.

Most older FCC units regenerate the spent catalyst in a single dense phase fluidized bed of catalyst. The single dense bed usually flows in either a swirl pattern, or in a crossflow pattern. These units work, but at relatively low efficiency compared to to more modern designs. The older units have had problems in establishing a desired gas flow through the bed, or were considered inefficient because they maintained the catalyst as a "bubbling" dense phase fluidized bed. Bubbling dense beds have never worked as well in large refinery units as they do in pilot plant size units. Much of the deficiency in operation was laid to the presence of large bubbles in the bed, which meant that the dense phase fluidized bed was not being efficiently used much of the time.

Most new units are of the High Efficiency Regenerator (H.E.R.) design using a coke combustor, a dilute phase transport riser, and a second dense bed, with recycle of some hot, regenerated catalyst from the second dense bed to the coke combustor. Units of this type are shown in U.S. Pat. No. 3,926,778 (which is incorporated by reference) and many other recent patents. The H.E.R. design is used in most new units because it permits operation of an FCC with less catalyst inventory (and hence less catalyst loss), and because such units tend to have both less CO emissions and less NOx emissions than the single dense bed regenerators.

The high efficiency design uses a fast fluidized dense bed for coke combustion. These dense bed are intensely agitated, and large bubbles are not stable in such beds. The high efficiency regenerator design can achieve complete regeneration of catalyst with perhaps half the catalyst inventory required in the older regenerators, using a bubbling fluidized bed.

In FCC units, much of the catalyst is lost due to attrition, and an increase in catalyst inventory increases catalyst loss to attrition. Much of the activity loss of the FCC catalyst is due to steaming in the regenerator. This steaming is not intentional, but most regenerators operate with 5-10 psia steam partial pressure (due to entrained stripping steam, and water of combustion). Thus the regenerator is not only a regenerator, it is a catalyst steamer, and deactivator. Increased catalyst inventory in the regenerator leads to increased steaming and deactivation of the FCC catalyst.

There is therefore a great incentive to do everything possible to reduce the catalyst inventory of a a regenerator, and to improve the efficiency of regenerator. That is why a majority of new FCC construction uses the high efficiency regenerator design.

Unfortunately, it has not been economically justifiable to convert older style, single dense bed regenerators to the modern H.E.R. design because of the high capital cost associated with simple scrapping the old single bed regenerator. Attempts to simple use the old single stage regenerator as part of a modern two stage, H.E.R. design have not been too successful, as the old single stage units are much larger than either of the beds in an H.E.R. unit. Another complication has been that many of the older units were not designed to operate at the higher temperatures associated with complete CO combustion.

Rather than scrap older FCC regenerators, refiners have tried to improve them, and the FCC process, as much as possible with improvments in catalyst and catalyst additives.

Actually, refiners have known for many years that there were problems with bubbling bed regenerators in general and with the swirl type regenerator in particular. A typical swirl type regenerator is shown in U.S. Pat. No. 3,817,280, which is incorporated herein by reference.

The swirl type regenerator adds spent catalyst to an FCC regenerator having a generally circular cross section. The catalyst is, added via a single inlet, to the dense bed of catalyst in the regenerator in a tangential direction, imparting a swirling motion to the dense bed. The catalyst swirls around roughly ¾ of the regenerator, and then is withdrawn as regenerated catalyst for reuse in the FCC process.

The swirl regenerator is an elegant concept which causes problems in practical operation. The spent catalyst, laden with coke and poorly stripped hydrocarbons, is added to one portion of the bed. The catalyst removed after one radial traverse of the bed has essentially no unstripped hydrocarbons, and a very low level of residual coke or carbon on catalyst. For efficient operation, the amount of regeneration gas added should roughly equal the amount of combustible substance to be burned, and this means that very large amounts of combustion air are need where spent catalyst is added, and almost no combustion air is needed where catalyst is withdrawn.

FCC operators have provided means for improving the distribution of combustion air to such regenerators. In U.S. Pat. No. 3,817,280, a better way of controlling the distribution of combustion air was provided. The air distribution grid beneath the bubbling dense bed was radially segmented, and means were provided for adjusting the flow of combustion air to each radial segment. In this way it was possible to fine tune the amount of air added to different radial segments of the bubbling fluidized bed.

The approach of U.S. Pat. No. 3,817,280 provided a better way to distribute the air to a swirl type regenerator. It ignored the problem of inefficiencies regards the distribution of solids to a swirl type regenerator.

In U.S. Pat. No. 3,904,548, which is incorporated herein by reference, recognized the problem of efficient operation of a large size fluidized bed. A baffle was provided, adjacent the tangential catalyst inlet, to mix some regenerated catalyst with incoming stripped catalyst. The baffle provided an expanding annulus of about 20 degrees in the direction of catalyst flow, to prevent undesired catalyst circulation.

The operation of swirl, and other, types of regenerators was significantly improved by the use of CO combustion promoters, discussed hereafter.

U.S. Pat. No. 4,072,600 and 4,093,535 teach use of combustion promoting metals such as Pt, Pd, Ir, Rh, Os, Ru and Re in cracking catalysts in concentrations of 0.01 to 50 ppm, based on total catalyst inventory. Such combustion promoters improve the rate of CO burning in all types of regenerators, both modern and old. CO combustion promoters help minimize CO emissions, but can cause an increase in the amount of nitrogen oxides (NOx) in the regenerator flue gas. It is difficult in a catalyst regenerator to completely burn coke and CO in the regenerator without increasing the NOx content of the regenerator flue gas. Swirl type regenerators are especially troublesome in this regard, i.e., enough excess air and CO combustion promoter can be added to meet CO limits, but this will greatly increase NOx emissions.

We realize that there was a problem with the basic design of the swirl type regenerator, not so much in the way air was distributed, but with the way the catalyst was distributed. We studied swirl type regenerators, and found that in many units 50% or more of the dense bed of catalyst was relatively stagnant.

We learned that use of a baffle, such as one disclosed in U.S. Pat. No. 3,904,548, did not significantly help reduce stagnant regions in the catalyst bed. The baffle of '548 would help reduce or eliminate bypassing, but would not address the problem of stagnant regions in the catalyst bed.

We also studied cross-flow type regenerators, wherein catalyst is added to one side of the regenerator and withdrawn from a catalyst sink or bathtub on the other side of the regenerator, at the base of the regenerator. Although the flows in the cross-flow type regenerators are quite different from those in the swirl type regenerator, both suffer from the same problem, namely that too much of the bed is stagnant.

We have discovered a way to overcome many of the deficiencies of stagnant regions in these large, bubbling bed regenerators by making changes in the way that catalyst was withdrawn.

In our parent case, we applied this technology to large size commercial units having catalyst inventories of 100 to 200 tons or more. The benefits of the present invention apply equally well to smaller, usually older, units have much smaller catalyst inventories.

BRIEF SUMMARY OF THE INVENTION

Accordingly, the present invention provides in a process for the fluidized catalytic cracking (FCC) of a hydrocarbon by contact of a crackable hydrocarbon with a source of regenerated FCC catalyst in a cracking reactor to produce catalytically cracked products and coked FCC catalyst which is regenerated in a single dense bed regenerator which maintains a catalyst inventory of from 10 up to 100 tons of catalyst as a dense phase, bubbling, fluidized bed of catalyst having a depth of at least 8 feet within a regenerator vessel having a diameter of at least 10 feet, wherein coked cracking catalyst is added via a single coked catalyst inlet having an inlet diameter of at least 1 foot, said inlet discharging coked catalyst into said regenerator dense bed, and wherein said coked catalyst is regenerated in said dense bed by contact with an upflowing supply of oxygen or an oxygen containing gas to produce regenerated catalyst which is withdrawn from said catalyst bed via a single catalyst outlet connected with said bubbling catalyst inlet, the improvement comprising use of a swirl regenerator comprising a swirling, fluidized dense bed of catalyst, wherein coked catalyst is added via a single inlet in the center of the regenerator dense bed and regenerated catalyst is withdrawn from said dense bed via at least two catalyst withdrawal means which are both radially distributed and symmetrically distributed about said single inlet.

In another embodiment, applicable to cross-flow rather than swirl regenerators, the present invention provides in a process for the fluidized catalytic cracking (FCC) of a hydrocarbon by contact of a crackable hydrocarbon with a source of regenerated FCC catalyst in a cracking reactor to produce catalytically cracked products and coked FCC catalyst which is regenerated in a single dense bed regenerator which maintains a catalyst inventory of from 10 up to 100 tons of catalyst as a dense phase, bubbling, fluidized bed of catalyst having a depth of at least 8 feet within a regenerator vessel having a diameter of at least 10 feet, wherein coked cracking catalyst is added via a single coked catalyst inlet having an inlet diameter of at least 1 foot, said inlet discharging coked catalyst into said regenerator dense bed, and wherein said coked catalyst is regenerated in said dense bed by contact with an upflowing supply of oxygen or an oxygen containing gas to produce regenerated catalyst which is withdrawn from said catalyst bed via a single catalyst outlet connected with said bubbling catalyst inlet, the improvement comprising use of a cross-flow regenerator wherein coked catalyst is added via a single catalyst inlet on a side of said regenerator and regenerated catalyst is withdrawn via at least two catalyst outlets separated by at least 5 feet and symmetrically located about, and on either side of flow of coked catalyst into said dense bed.

DETAILED DESCRIPTION

The invention can be better understood with reference to the drawings, and a discussion of the prior art swirl type regenerator.

Figure 1:
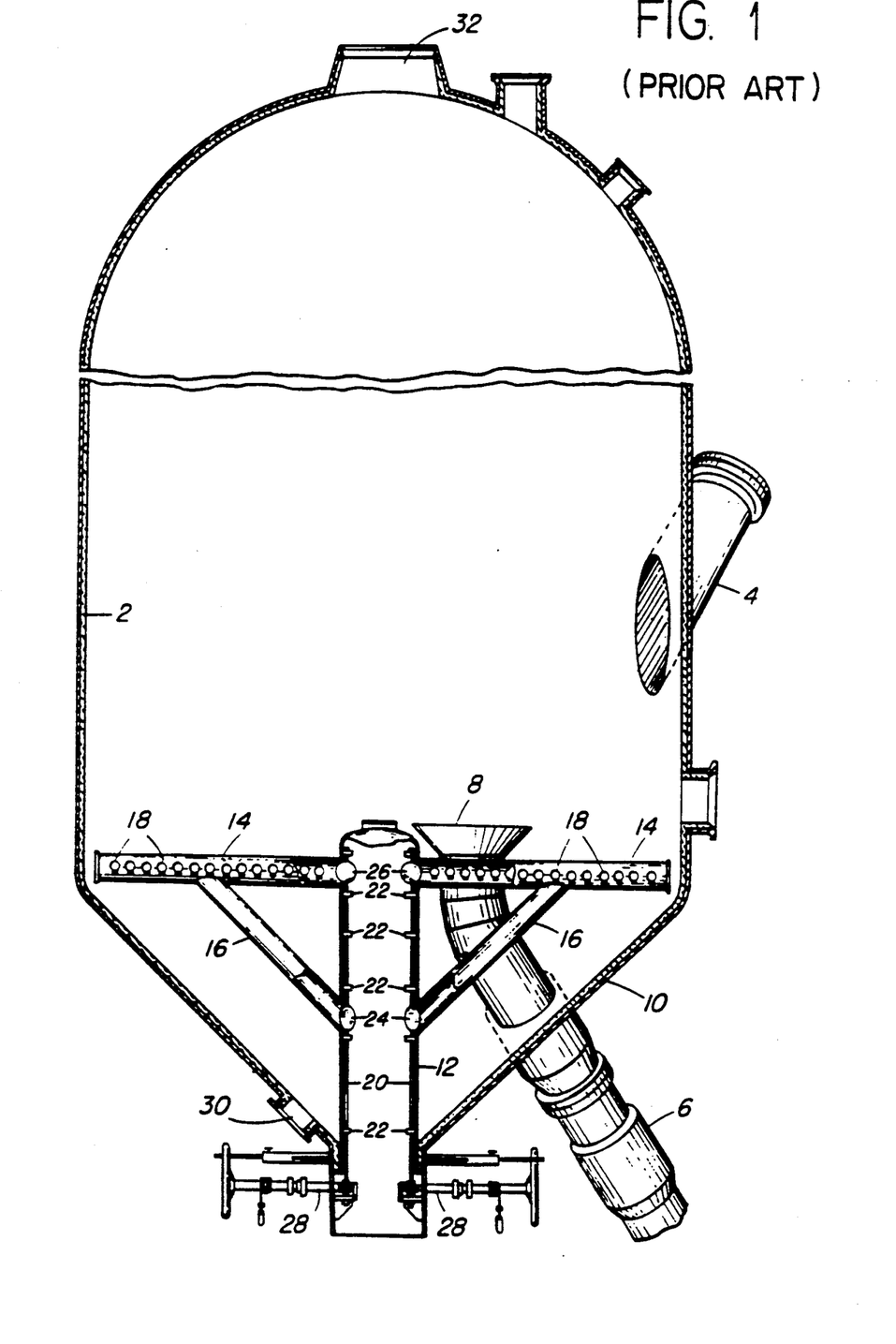
FIG. 1 (prior art) is a simplified, cross-sectional view of a swirl type regenerator, taken from U.S. Pat. No. 3,817,280.

Referring now to FIG. 1 by way of example, there is shown in elevation a regeneration vessel comprising a regeneration gas distributor means with flow control valve means in the inlet of each supply conduit to a given regeneration gas distributing means. In the arrangement of FIG. 1, a regenerator vessel 2 is shown. Cyclone means with connecting diplegs normally positioned in the upper portion of a regeneration vessel are not shown to simplify the drawing. A catalyst inlet conduit 4 is provided for introducing spent catalyst containing carbonaceous deposits to the regeneration vessel. The conduit 4 may be positioned to provide for tangential introduction of the finely divided catalyst particles to the regeneration vessel. A conduit 6 extending upwardly into the vessel and terminating in a funnel shaped mount 8 above the distributor grid provides means for withdrawing regenerated catalyst from the vessel. The bottom of the regenerator vessel 2 is provided with a conical bottom 10. A regeneration gas inlet conduit or manifold 12 concentrically extends upwardly through the conical bottom of the vessel and terminates at a level substantially coinciding with the lowest vertical wall portion of the vessel. A plurality of conduit means 14 extend substantially horizontally outwardly from said vertically extending concentric manifold to provide a grid means more clearly identified in FIG. 2. Support conduits 16 in open communication with conduits 12 and 14 provide structural support to the grid means of FIG. 2 in addition to providing additional regeneration gas to outer portions of each segment of the distributing grid. Pipe means 18 horizontally extends substantially at right angles to distributing conduits 14 as shown more clearly in FIG. 2. Vertical rods 20 retained by bearings 22 adjacent the inner wall of manifold pipe 12 are provided with disc shape plates 24 and 26 which are valve means for adjusting the flow of gases passing from manifold 12 into either conduit 14 or 16. Thus by turning the rods, the disc shaped plates attached thereto may be turned to provide a restricted flow of gas into the pipe or a substantially unrestricted flow of gas into the pipe. The bottom end of each rod is provided with a gear in matching engagement with a work gear on the end of an adjusting rod 28 extending through the wall of inlet pipe 12 external to the vessels conical bottom 10. The adjusting rod is provided with a hand wheel on the outside end thereof and means are provided for locking the hand wheel in a selected position. A covered manhole 30 is provided in the lower portion of the conical bottom 10.

In the apparatus of FIG. 1, the regeneration gas enters the bottom of the vessel by vertically extending conduit 12 and passes out through conduits 16 and 14 to distributor pipes 18 with the flow through each conduit 16 and 14 controlled by disc valves 24 and 26 rigidly attached to adjusting rod means 20. The regenerating gas passed to pipes 18 then passes out through holes or nozzles along the bottom surface of the pipes and then upwardly through a bed of catalyst to be regenerated under fluid phase regeneration conditions. Regenerated catalyst is withdrawn from the vessel above the grid by conical inlet 8 communicating with conduit 6. The inlet to withdrawal conduit 6 may be as shown in FIG. 1 or it may be extended upwardly into the vessel so that regenerated catalyst is withdrawn from an upper portion of the dense fluid bed of catalyst rather than a lower portion thereof as shown. Regeneration gas after passing through suitable cyclone separators not shown and positioned in an upper portion of the regenerator passes into a plenum chamber not shown and then out the top of the regenerator vessel as by opening 32.

Figure 2:
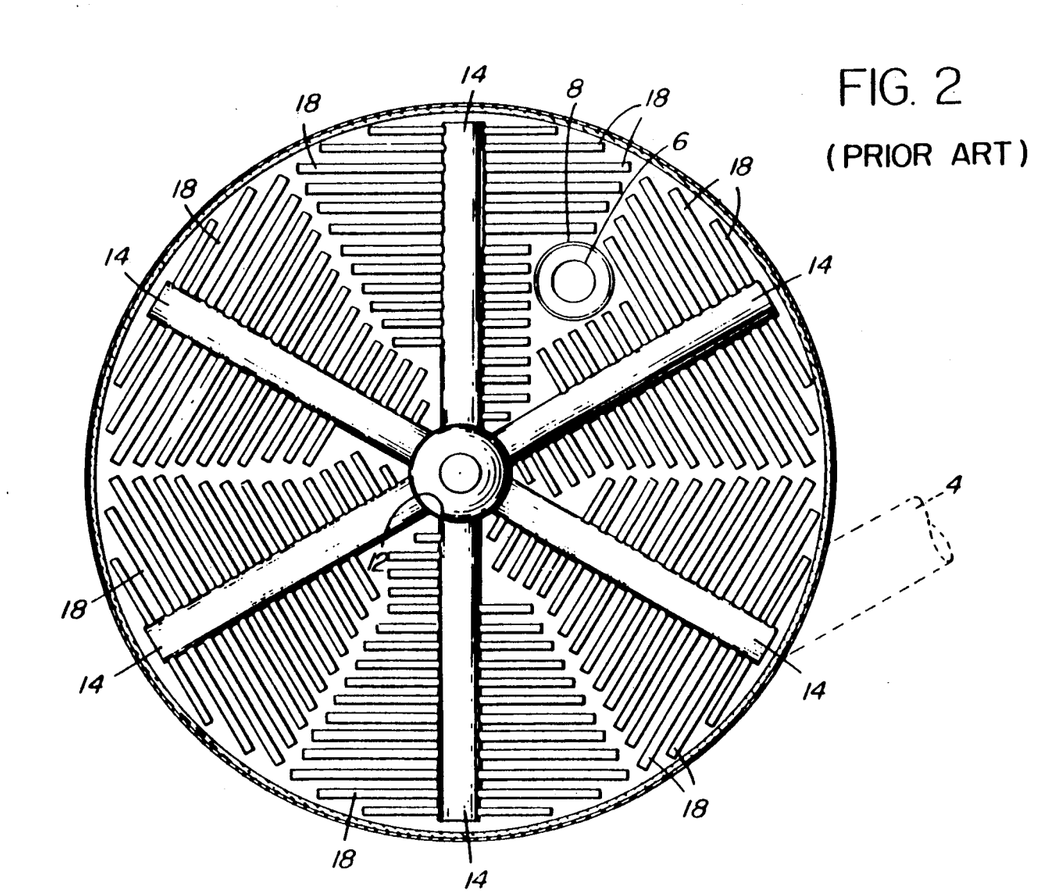
FIG. 2 (prior art) is a cross sectional view of the swirl type regenerator of U.S. Pat. No. 3,817,280.

In the arrangement of FIG. 2 there is shown the segmented regeneration gas distributor grid comprising pipes 18, distributing conduits 14 and concentric regeneration gas inlet conduit 12 which is closed at its upper end positioned within vessel 2. Catalyst withdrawal funnel 8 connected to conduit 6 is shown positioned between two of the segmented distributing grids. The dotted conduit 4 at the side of the drawing is intended to show the relationship of the catalyst inlet conduit 4 to the withdrawal funnel 8.

Figure 3:
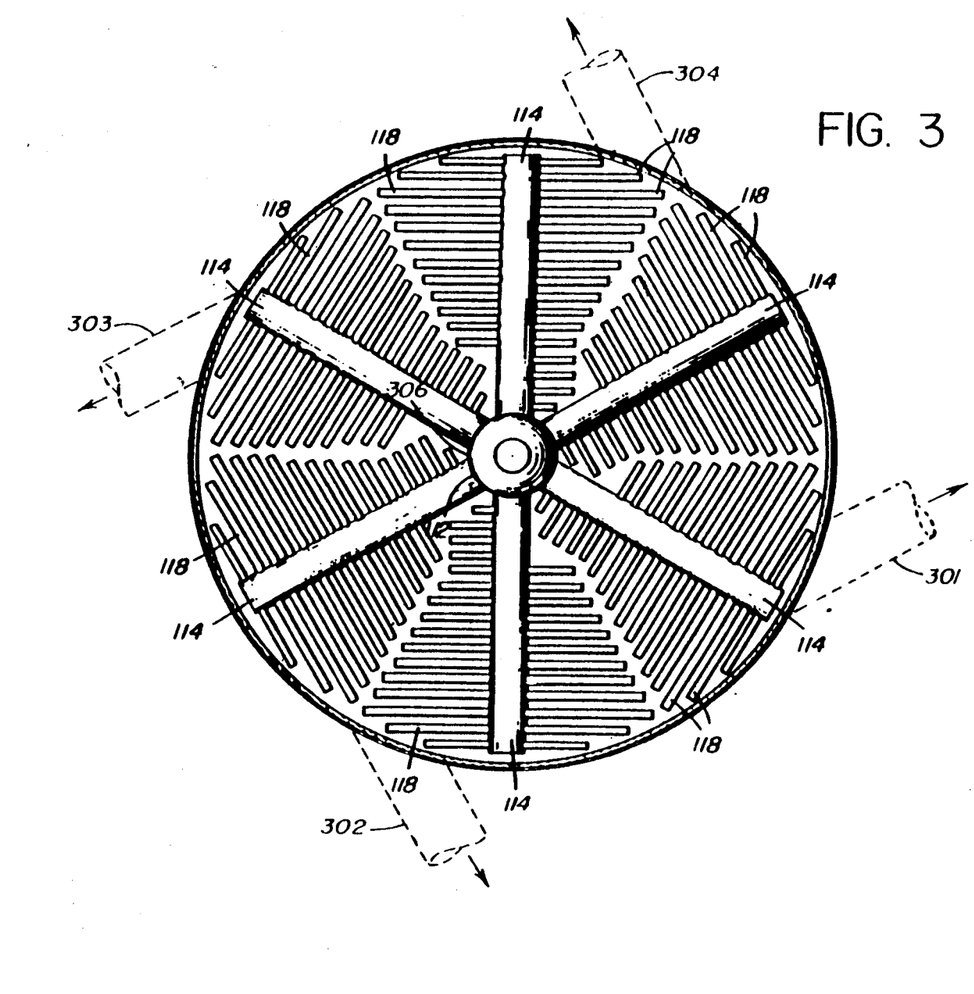
FIG. 3 is a simplified, cross sectional view of an improved swirl type regenerator of the present invention, with a single central catalyst inlet and four radially distributed catalyst withdrawal outlets.

FIG. 3 shows one preferred embodiment of the present invention, a swirl type regenerator with four symmetrical catalyst outlets and a central catalyst inlet.

FIG. 3 is closely patterned after FIG. 2, and elements 112-118 correspond to elements 12-18, respectively in FIG. 2. Thus the distributor grid comprises pipes 118 and conduits 114. Catalyst is centrally added via central catalyst inlet 306. Inlet 306 corresponds to the old catalyst sink or outlet. Central inlet 306 would gently distribute catalyst into the bubbling dense bed, in part because of its relatively large size (the catalyst sink or bathtub is typically 5-10 feet in diameter, always much larger than the catalyst inlet line). The use of a relatively large central inlet is beneficial but not essential. A more conventionally sized catalyst inlet, i.e., one that is much smaller, and is sized to accommodate the desired flow of coked catalyst into the regenerator at a velocity of 5-10 feet per second, may also be used. The coked catalyst may be added to the bottom of the regenerator, as shown in FIG. 3, or may be added to the top of the regenerator.

Regenerated catalyst is withdrawn via four outlets 301, 302, 303 and 304 for reuse in the FCC process. Usually it will be preferred to have the outlets in the upper portion of the bed when the inlet is in the lower portion, but this is not essential. All inlets and outlets can be near the top of the bubbling bed, or near the bottom of the bed. It will frequently be easier to retrofit four catalyst withdrawal outlets via side entering lines, as opposed to making major revisions to the air grid or air distribution system.

Figure 4:
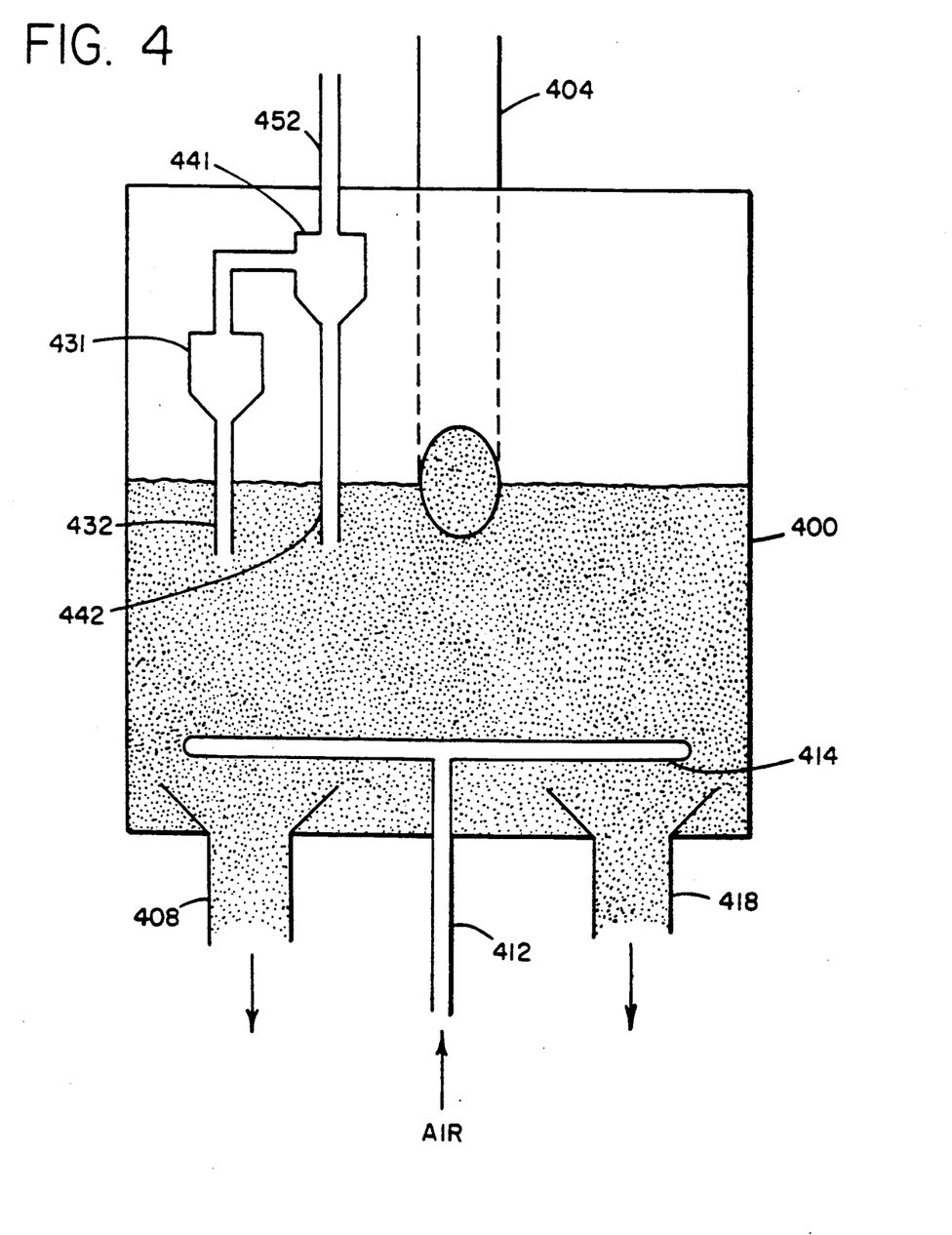
FIG. 4 is a simplified, cross sectional view of an improved cross-flow regenerator of the present invention, with a single catalyst inlet on the side of the regenerator and two catalyst withdrawal outlets.

FIG. 4 is a simplified, cross-sectional view of a cross-flow type regenerator of the present invention. The cross-flow regenerator is typical of many in commercial use, with the difference being use of two catalyst withdrawal points, somewhat to the sides of and across from, the catalyst inlet. In the prior art design, not shown, the catalyst sink was directly across from the catalyst inlet.

Spent catalyst in line 404 is discharged down into regenerator 400. Air passes up into the regenerator via air inlet 412 and air grid 414, and fluidizes and regenerates the catalyst, which is maintained as a bubbling fluidized dense phase bed.

Catalyst flows generally across the regenerator from the catalyst inlet, to two catalyst outlets or sinks 408 and 418 which are in the base of the air grid 414, and are therefore on the bottom of the bubbling fluidized bed of catalyst. Catalyst flow is still generally cross-flow, but because of the sideward displacement of the two catalyst outlets there is a significant amount of splitting of the stream of coked catalyst into two streams. By proper selection of the location of the two catalyst outlets, it is possible to set up currents which scour the far walls of the regenerator, and create two swirl type regenerators in the bubbling bed. There is another advantage to the cross-flow type design with multiple outlets as shown in FIG. 4, namely that the catalyst has a very lengthy path to travel before it hits a wall. This increased flow path length allows the entering catalyst to have more contact with catalyst already in the bed, and allows more of the kinetic energy of the incoming catalyst stream to be used in stirring up the dense bed to keep more of the dense bed active.

Flue gas and entrained catalyst rise above the bubbling bed, pass through primary cyclone 431 and secondary cyclone 441. Catalyst is recycled to the dense bed via diplegs 432 and 442, while flue gas is discharged via outlet 432.

Although FIG. 4 shows use of two catalyst outlets, it is possible to modify an existing regenerator with a single outlet so that catalyst can be withdrawn from two places in the regenerator and pass out the existing catalyst outlet.

EXPERIMENTS - COMPUTER SIMULATIONS

Extensive experimental work studying commercial and laboratory size fluidized bed, and further work on developing a computer program which allowed us to accurately model the behavior of large, commercial FCC regenerators.

As a result of our study, we discovered that the conventional swirl type regenerator, such as that disclosed in FIG. 1 and FIG. 2, leaves 60% of the dense phase, bubbling fluidized bed of catalyst relatively stagnant. We define a stagnant region as one where predicted streamlines form a closed loop, i.e., the net flow of catalyst from inlet to outlet is outside the boundaries of this loop.

We tried to improve this design using baffles, or countercurrent catalyst addition. Most things we tried actually increased the size of the stagnant regions. None could reduce the size of the stagnant region below 50%.

We then discovered that by shifting the catalyst inlet to the center of the unit, and by splitting the catalyst withdrawal among two outlets, we were able to make a majority of the catalyst bed active. By going to four symmetrically placed catalyst outlets we were able to achieve a breakthrough in bed behavior, and get a bed with only 5% stagnant region.

Providing two or four points of catalyst withdrawal will involve a substantial capital expense, because these lines are so large, and because the pipe should be made symmetrical, to ensure an even distribution of regenerated catalyst between multiple outlets. The cost of moving the catalyst inlet to the center of the swirl bed will also be substantial, but well worth it in terms of improved use of the bubbling dense bed. Where more stagnant regions can be tolerated the catalyst can be added via the old catalyst withdrawal sink or bathtub. This will not be quite as efficient as a central addition point for catalyst, but will greatly reduce the capital cost, because it is easy to add coked catalyst via the old spent catalyst outlet.

Another alternative to providing multiple outlets is use of the old outlet, with baffles added to force the catalyst to be withdrawn from at least two places in the bed. Baffles are relatively low cost, are sturdy, and will permit the existing catalyst outlet, and even the existing catalyst inlet to be used. An anti-cavitation device alone is not enough, though it could be used as the starting point in a catalyst distribution system to achieve withdrawal of regenerated catalyst from multiple points of the catalyst bed. The old outlet could be covered with something like a plenum chamber, and 2 or more large conduits used to connect the plenum to other regions in the dense bed. A cubic or pyramidal insert, with one hole for admission of catalyst near the old outlet, and holes connected with pipes or tubes connective with more remote regions of the dense bed, is one way of achieving multiple catalyst withdrawal points using a single catalyst outlet.

Yet another alternative to providing multiple outlets is use an infinite number of outlets, e.g., to provide a central catalyst inlet and withdraw regenerated catalyst from a continuous opening at or near the circumference of the the regenerator dense bed. One way in which this could be implemented in a reconfigured swirl type regenerator is by adding spent catalyst to the center of the bed, via the old catalyst inlet or outlet, perhaps coupled with a deflector to do a better job of centering the flow of coked catalyst into the dense bed, and removing catalyst from the bed circumference. The regenerated catalyst can be withdrawn from the dense bed by providing a collection trough or overflow weir at the surface of the dense bed, around the circumference of the dense bed. Regenerated catalyst can also be withdrawn from the base of the dense bed, by providing a continuous slot or other equivalent opening around the circumference of the dense bed, at any elevation desired within the dense bed. When a grid of pipes is used to admit regeneration air, it will be relatively easy to block off some of the air holes in the pipes nearest the circumference of the vessel, and this will allow regenerated catalyst to be withdrawn from the dense bed via the resulting 6–18 stagnant region at the base of the regenerator above the plugged air grids.

The results of several computer simulation tests are reported below in the tables. Although these simulations were originally run to determine the effect of multiple inlets for coked catalysts, the results are also indicative of what can be achieved with multiple catalyst outlets, while retaining a single catalyst inlet. Table 1 is directed to swirl type regenerators, while Table 2 is directed to cross-flow type regenerators.

TABLE 1

| | SWIRL TYPE REGENERATORS | | |
|---|---|---|---|
| | INLET | OUTLET | STAGNANT REGION, % |
| 1 | ONE | ONE TO SIDE | 60% |
| 2 | 2 SYMMETRICAL | CENTER | 40% |
| 3 | 4 SYMMETRICAL | CENTER | 5% |
| 4 | 2 COUNTER | CENTER | 70% |
| 5 | 2 COUNTER | ONE TO SIDE | 80% |
| 6 | BAFFLE A | ONE TO SIDE | 50% |
| 7 | BAFFLE B | ONE TO SIDE | 65% |

Simulation 1, the first reported case in Table 1, is that of the prior art design, as shown in U.S. Pat. No. 3,817,280.

In simulation run 2, two symmetrical inlets means that there were two tangential inlets 180 degrees apart from one another. In the case of four symmetrical inlets (run 3), they were spaced 90 degrees apart, much as shown in FIG. 3.

In run 4, two countercurrent inlets were spaced 180 degrees apart, one adding catalyst clockwise and one adding catalyst counterclockwise. The inlets pointed away from the catalyst outlet in simulation 5.

In simulation 6, with Baffle A, the baffle was placed at the boundary between the stagnant region and the main catalyst flow, above the far edge of the coked catalyst inlet in the direction of the swirl, thus cutting streamlines and decreasing bypassing. The baffles length was 3.0 feet, and it was located along a radius, with the far edge 1.5 feet from the regenerator wall.

In simulation 7, with Baffle B, the baffle was placed slightly further in the direction of the swirl and also slightly closer to the walls of the regenerator. Its length was the same as that of Baffle A, but its far edge was only 1 foot from the regenerator wall.

In U.S. Pat. No. 3,904,548, the baffle was a curved, upwardly extending baffle placed inwardly from the other wall of the regenerator. The baffle would prevent short-circuiting of catalyst, ensuring that more of the spent catalyst entering the bed would radially traverse the bed, rather than bypass the bed and exit prematurely. The baffle of U.S. Pat. No. 3,904,548 corresponds most closely to Baffle A.

The approximate dimensions of a typical swirl type regenerator, associated with a typical 60,000 BPD cracking unit are as follows. The overall ID of the regenerator vessel is 36 feet. The catalyst flow is 3600 tons/hr into the regenerator. The catalyst is added via one tangential inlet pipe having an ID of 36 inches. The catalyst velocity as it leaves the inlet is about 6 feet/sec. It is discharged into a dense phase fluidized bed of catalyst having a depth of about 10 feet. The catalyst sink, or bathtub, has an opening of 96 inches for withdrawal of hot, regenerated catalyst.

TABLE 2
CROSS FLOW REGENERATORS

| | INLET | OUTLET | STAGNANT REGION, % |
|---|---|---|---|
| 8 | ONE | ONE @ SIDE | 65% |
| 9 | 2 SYMMETRICAL | CENTER | 60% |
| 10 | 4 SYMMETRICAL | CENTER | 50% |
| 11 | 2, 40 degrees | ONE @ SIDE | 40 |
| 12 | BAFFLE | ONE @ SIDE | 30 |
| 13 | 80% BAFFLE | ONE @ SIDE | 8 |

Simulation 8 represents a conventional, prior art, cross flow regenerator design.

In run 9, the two symmetrical inlets were two tangential inlets 180 degrees apart from one another. In run 10, four symmetrical inlets were used, spaced 90 degrees apart.

In run 11, two inlets spaced 40 degrees apart, with a single, central catalyst outlet gave better results, but at a significant capital expense.

In simulation 12, with a baffle normal to the flow of incoming catalyst, acting to split the flow into two streams, the active or non stagnant area of the catalyst bed was doubled, from 35% active to 70% active. This was accomplished with no modifications to the spent catalyst inlet or the regenerated catalyst outlet.

In simulation 13, the baffle design allows 20% of the catalyst from the catalyst inlet to bypass the baffle, while 80% is baffled, i.e., split into two streams which are deflected or diverted roughly sideways.

The approximate dimensions of a typical cross flow regenerator, associated with a typical 20,000 BPD cracking unit are as follows. The overall ID of the regenerator vessel is about 16 feet. The catalyst flow is 1200 tons/hr into the regenerator. The catalyst is added via one tangential inlet pipe having an ID of 18 inches. The catalyst velocity as it leaves the inlet is about 5 feet per second. It is usually discharged at an angle (40 degrees) into a dense phase fluidized bed of catalyst having a depth of about 12 to 20 feet. The catalyst sink, or bathtub, has an ID of about 5 feet for withdrawal of catalyst. The sink is at the opposite side of the regenerator from the catalyst inlet.

Many cross-flow regenerators are somewhat larger than this. The regenerator associated with a 50–60,000 BPD unit will have a catalyst inventory of around 200 tons and will be much larger than the smaller unit described above. The regenerator diameter will be about 30 to 36 feet, and the catalyst inlet line will have an ID of about 3 feet. The catalyst velocity in the inlet line will still be about the same, e.g, about 6 fps. The catalyst flow in such a unit will be 3600 tons per hour into the regenerator. The dense phase fluidized bed of catalyst will have a depth of 10–15 feet. The catalyst sink or bathtub will have an ID of about 7 or 8 feet.

Although most commercial cat cracking capacity is in large units, those having catalyst inventories in excess of 100 tons, many smaller units exist which have smaller catalyst inventories, ranging from 50 tons to a few having inventories of 13–15 tons. Essentially all commercial FCC units will have a catalyst inventory of at least 10 tons of FCC catalyst.

The conditions in both the cross flow and the swirl type regenerator re. air flow, temperature, catalyst type, are all conventional. The invention has nothing to do with a new catalyst, it is directed solely to reducing the stagnant regions in existing regenerators to improve their operation.

Improved catalyst flow in the dense bed of a regenerator will increase the carbon burning capacity of the regenerator, allowing the regenerator to produce catalyst with lower residual carbon levels, or alternatively to increase catalyst throughputs. The better operation of the dense bed will greatly simplify the design and operation of the air grid used to add combustion air. Because of more uniform bed operation, and more efficient use of combustion air, there will be a reduction in CO emissions, and a reduction in NOx emissions that would otherwise be associated with localized high concentrations of air due to stagnant regions in the prior art design.

I claim:

1. In a process for the fluidized catalytic cracking (FCC) of hydrocarbon by contact of a crackable hydrocarbon with a source of regenerated FCC catalyst in a cracking reactor to produce catalytically cracked products and coked FCC catalyst which is regenerated in a single dense bed regenerator which maintains a catalyst inventory of from 10 up to 100 tons of catalyst as a dense phase, bubbling, fluidized bed of catalyst having a depth of at least 8 feet within a regenerator vessel having a diameter of at least 10 feet, wherein coked cracking catalyst is added via a single coked catalyst inlet having an inlet diameter of at least 1 foot, said inlet discharging coked catalyst into said regenerator dense bed, and wherein said coked catalyst is regenerated in said dense bed by contact with an upflowing supply of oxygen or an oxygen containing gas to produce regenerated catalyst which is withdrawn from said catalyst bed via a single catalyst outlet connected with said bubbling catalyst inlet, the improvement comprising use of a swirl regenerator comprising a swirling, fluidized dense bed of catalyst, wherein coked catalyst is added via a single inlet in the center of the regenerator dense bed and regenerated catalyst is withdrawn from said dense bed via at least two catalyst withdrawal means which are both radially distributed and symmetrically distributed about said single inlet.

2. The process of claim 1 further characterized in that catalyst withdrawal means are connective at one end with at least two catalyst collection points which are radially and symmetrically distributed about said dense bed and at the other end with a single catalyst withdrawal outlet.

3. The process of claim 1 further characterized in that the regenerator produces flue gas comprising CO and oxides of nitrogen (NOx) and said withdrawal of regenerated catalyst from multiple locations in said bubbling dense bed reduces the CO and NOx content of said flue gas.

4. The process of claim 1 further characterized in that the regenerator has a coke burning capacity and said withdrawal of regenerated catalyst from multiple locations in said bubbling dense bed increases the coke burning capacity of said regenerator by at least 35%.

5. The process of claim 1 further characterized in that said withdrawal of regenerated catalyst from multiple locations in said bubbling dense bed reduces the stagnant area of said regenerator by at least 35%.

6. The process of claim 1 further characterized in that said withdrawal of regenerated catalyst from multiple locations in said bubbling dense bed reduces the stagnant area of said regenerator by at least 50%.

7. The process of claim 1 further characterized in that regenerated catalyst is withdrawn from a continuous catalyst removal means located at a circumference of said dense bed whereby there is radial flow of catalyst from said catalyst inlet to said continuous catalyst withdrawal means.

8. In a process for the fluidized catalytic cracking (FCC) of a hydrocarbon by contact of a crackable hydrocarbon with a source of regenerated FCC catalyst in a cracking reactor to produce catalytically cracked products and coked FCC catalyst which is regenerated in a single dense bed regenerator which maintains a catalyst inventory of from 10 up to 100 tons of catalyst as a dense phase, bubbling, fluidized bed of catalyst having a depth of at least 8 feet within a regenerator vessel having a diameter of at least 10 feet, wherein coked cracking catalyst is added via a single coked catalyst inlet having an inlet diameter of at least 1 foot, said inlet discharging coked catalyst into said regenerator dense bed, and wherein said coked catalyst is regenerated in said dense bed by contact with an upflowing supply of oxygen or an oxygen containing gas to produce regenerated catalyst which is withdrawn from said catalyst bed via a single catalyst outlet connected with said bubbling catalyst inlet, the improvement comprising use of a cross-flow regenerator wherein coked catalyst is added via a single catalyst inlet on a side of said regenerator and regenerated catalyst is withdrawn via at least two catalyst outlets separated by at least 5 feet and symmetrically located about, and on either side of flow of coked catalyst into said dense bed.

9. The process of claim 8 further characterized in that coked catalyst is added via a single catalyst inlet on a side of said regenerator and regenerated catalyst is withdrawn via a catalyst withdrawal means connective at one end with at least two catalyst collection points separated by at least 5 feet and symmetrically located about, and on either side of flow lines defined by flow of coked catalyst into said dense bed, and at the other end with a single catalyst outlet.

10. The process of claim 8 further characterized in that the regenerator produces flue gas comprising CO and oxides of nitrogen (NOx) and said withdrawal of regenerated catalyst from multiple locations in said bubbling dense bed reduces the CO and NOx content of said flue gas.

11. The process of claim 8 further characterized in that the regenerator has a coke burning capacity and said withdrawal of regenerated catalyst from multiple locations in said bubbling dense bed increases the coke burning capacity of said regenerator by at least 35%.

12. The process of claim 8 further characterized in that said withdrawal of regenerated catalyst from multiple locations in said bubbling dense bed reduces the stagnant area of said regenerator by at least 35%.

13. The process of claim 9 further characterized in that said withdrawal of regenerated catalyst from multiple locations in said bubbling dense bed reduces the stagnant area of said regenerator by at least 50%.

* * * * *